United States Patent
Morgan et al.

(10) Patent No.: US 9,937,908 B2
(45) Date of Patent: Apr. 10, 2018

(54) VEHICLE WITH MODEL-BASED CONTROL OF AN ACTIVE AERODYNAMIC ELEMENT

(71) Applicant: GM GLOBAL TECHNOLOGY OPERATIONS LLC, Detroit, MI (US)

(72) Inventors: Chris Morgan, Ann Arbor, MI (US); James H Holbrook, Fenton, MI (US); Edmund F. Gaffney, III, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 75 days.

(21) Appl. No.: 15/235,902

(22) Filed: Aug. 12, 2016

(65) Prior Publication Data

US 2017/0080908 A1 Mar. 23, 2017

Related U.S. Application Data

(60) Provisional application No. 62/219,809, filed on Sep. 17, 2015.

(51) Int. Cl.

| | |
|---|---|
| *B60R 22/00* | (2006.01) |
| *E05F 15/00* | (2015.01) |
| *G05D 1/00* | (2006.01) |
| *G05D 3/00* | (2006.01) |
| *G06F 7/00* | (2006.01) |
| *G06F 17/00* | (2006.01) |
| *B60T 8/1755* | (2006.01) |

(Continued)

(52) U.S. Cl.
CPC ............ *B60T 8/17551* (2013.01); *B60T 1/16* (2013.01); *B60T 8/171* (2013.01); *B62D 35/007* (2013.01);

(Continued)

(58) Field of Classification Search
CPC ..... B62D 35/005; B62D 35/007; B62D 37/02

(Continued)

(56) References Cited

U.S. PATENT DOCUMENTS

| | | | | |
|---|---|---|---|---|
| 4,810,022 A | * | 3/1989 | Takagi | ................. B62D 35/005 180/197 |
| 5,435,193 A | * | 7/1995 | Halliday | ................. B60T 8/172 280/5.521 |

(Continued)

FOREIGN PATENT DOCUMENTS

| | | |
|---|---|---|
| EP | 1516794 A1 | 3/2005 |
| WO | 2003008243 A1 | 1/2003 |

*Primary Examiner* — Harry Y Oh
(74) *Attorney, Agent, or Firm* — Quinn IP Law

(57) ABSTRACT

A method for controlling an active aerodynamic element in a vehicle having road wheels with tires in contact with a road surface includes receiving driver input signals and vehicle kinematics data. The driver input signals correspond to a requested aerodynamic performance operating point. Tire coefficients of friction in the longitudinal and lateral directions are provided to the controller. Desired longitudinal and lateral forces acting on the tires are determined using the input signals, kinematics data, and actual force data. Additionally, a desired total aerodynamic downforce for meeting the aerodynamic performance operating point is determined as a function of the tire forces and coefficients. A position of the aerodynamic element(s) is controlled such that the total aerodynamic downforce is achieved. A system includes the aerodynamic element(s), actuator(s), and controller. A vehicle includes the body, road wheels, active aerodynamic element(s), actuator(s), and controller.

17 Claims, 2 Drawing Sheets

(51) Int. Cl.
    *B62D 35/00*     (2006.01)
    *B60T 1/16*     (2006.01)
    *B60T 8/171*     (2006.01)
    *B62D 37/02*     (2006.01)

(52) U.S. Cl.
    CPC .......... *B62D 37/02* (2013.01); *B60T 2210/12* (2013.01); *B60T 2270/86* (2013.01); *Y02T 10/88* (2013.01)

(58) Field of Classification Search
    USPC .......................................................... 701/49
    See application file for complete search history.

(56) References Cited

U.S. PATENT DOCUMENTS

| | | | |
|---|---|---|---|
| 5,821,434 A * | 10/1998 | Halliday | B60G 7/008 280/5.52 |
| 7,028,540 B2 * | 4/2006 | Morikawa | G01L 5/161 73/146 |
| 7,845,218 B2 * | 12/2010 | Joe | B60W 40/101 73/146.5 |
| 9,308,950 B2 * | 4/2016 | Wolf | B62D 35/005 |
| 9,701,401 B2 * | 7/2017 | Raby | B64C 25/46 |
| 2006/0253243 A1 * | 11/2006 | Svendenius | B60T 8/172 701/70 |
| 2009/0177346 A1 * | 7/2009 | Hac | B60W 30/045 701/31.4 |
| 2010/0090497 A1 * | 4/2010 | Beckon | B60Q 1/2661 296/180.5 |
| 2012/0053788 A1 * | 3/2012 | Amino | B60G 17/0165 701/37 |
| 2012/0179327 A1 * | 7/2012 | Yngve | B60W 40/064 701/32.9 |
| 2012/0275172 A1 * | 11/2012 | Mizuno | B60Q 1/085 362/464 |
| 2015/0254990 A1 * | 9/2015 | Raby | B64C 25/426 701/16 |

\* cited by examiner

VEHICLE WITH MODEL-BASED CONTROL OF AN ACTIVE AERODYNAMIC ELEMENT

CROSS-REFERENCE TO RELATED APPLICATIONS

This application claims the benefit of U.S. Provisional Patent Application Ser. No. 62/219,809, filed on Sep. 17, 2015, the disclosure of which is hereby incorporated by reference.

TECHNICAL FIELD

The present disclosure relates to a vehicle with model-based control of an active aerodynamic element.

BACKGROUND

Goals of aerodynamic vehicle design include reducing drag, wind noise, and vehicular noise emission, as well as preventing undesired lift forces and other potential causes of aerodynamic instability. A desirable aerodynamic effect is the generation of sufficient amounts of aerodynamic downforce, which in turn can optimize tire traction, cornering performance, and overall vehicle handling. In order to achieve sufficient aerodynamic downforce, a vehicle body is typically configured with a number of front, side, and/or rear aerodynamic elements such as air dams, splitters, spoilers, wings, and diffusers. As tradeoff exists between generated aerodynamic downforces, fuel economy, and top speed, the position of some aerodynamic elements may be actively controlled and thus selectively deployed in order to provide sufficient additional aerodynamic downforce.

SUMMARY

A method and system are disclosed herein for controlling one or more active aerodynamic elements in a vehicle. In various embodiments, a controller is programmed and equipped in hardware, i.e., configured, to process dynamic input information, which may be driver-requested and/or autonomously-determined values such as braking levels, torque request, and steering angle, so as to calculate a requested aerodynamic performance operating point. The controller then uses the dynamic input information and tire friction information, e.g., from a tire friction model or other source of modeled, estimated, and/or calculated tire friction information, to determine an aerodynamic downforce for the controller to command from the active aerodynamic element(s). The controller selectively commands a position of one or more of the aerodynamic elements via transmission of control signals to corresponding actuators to achieve the aerodynamic downforce. In this manner, the controller is able to achieve the requested aerodynamic performance operating point. The present "force space" strategy is thus used to automatically achieve target front and/or rear aerodynamic downforces rather than relying on driver-controlled actuation or multiple heuristic control rules with cross-calibration per vehicle.

In an example embodiment, a method is disclosed for controlling an aerodynamic element in a vehicle having road wheels with tires in frictional contact with a road surface. The method includes receiving, via a controller, a set of dynamic input signals and vehicle kinematics data. The set of dynamic input signals corresponds to a requested aerodynamic performance point, which may be driver-requested and/or autonomously-determined in different embodiments.

The method also includes determining longitudinal and lateral tire coefficients of friction and then computing desired longitudinal and lateral tire forces using the dynamic input signals and kinematics data, as well as actual tire forces.

Additionally, the method includes calculating a total aerodynamic downforce necessary to meet the requested aerodynamic performance operating point, with the calculation being performed as a function of the longitudinal and lateral tire forces and tire coefficients of friction. A position of the aerodynamic element or elements is thereafter controlled via the controller such that the total aerodynamic downforce is achieved.

A system is also disclosed herein that includes one or more active aerodynamic elements, an actuator connected to the aerodynamic element(s) and operable for adjusting a position of the aerodynamic element(s) in response to control signals, and a controller configured to execute the above-described method.

A vehicle includes a body, road wheels, an active aerodynamic element, an actuator, and a controller. The road wheels are positioned with respect to the body, and each includes a tire in rolling contact with a road surface. The active aerodynamic element is connected to the body, and is configured to selectively deploy from the body into an oncoming ambient airstream when the vehicle is in motion. The actuator is connected to the active aerodynamic element and is operable for adjusting a position of the active aerodynamic element in response to control signals. The controller is configured to execute the method noted above.

The above described and other features and advantages of the present disclosure will be readily apparent from the following detailed description of the embodiments and best modes for carrying out the described disclosure when taken in connection with the accompanying drawings and appended claims.

DETAILED DESCRIPTION

Figure 1:
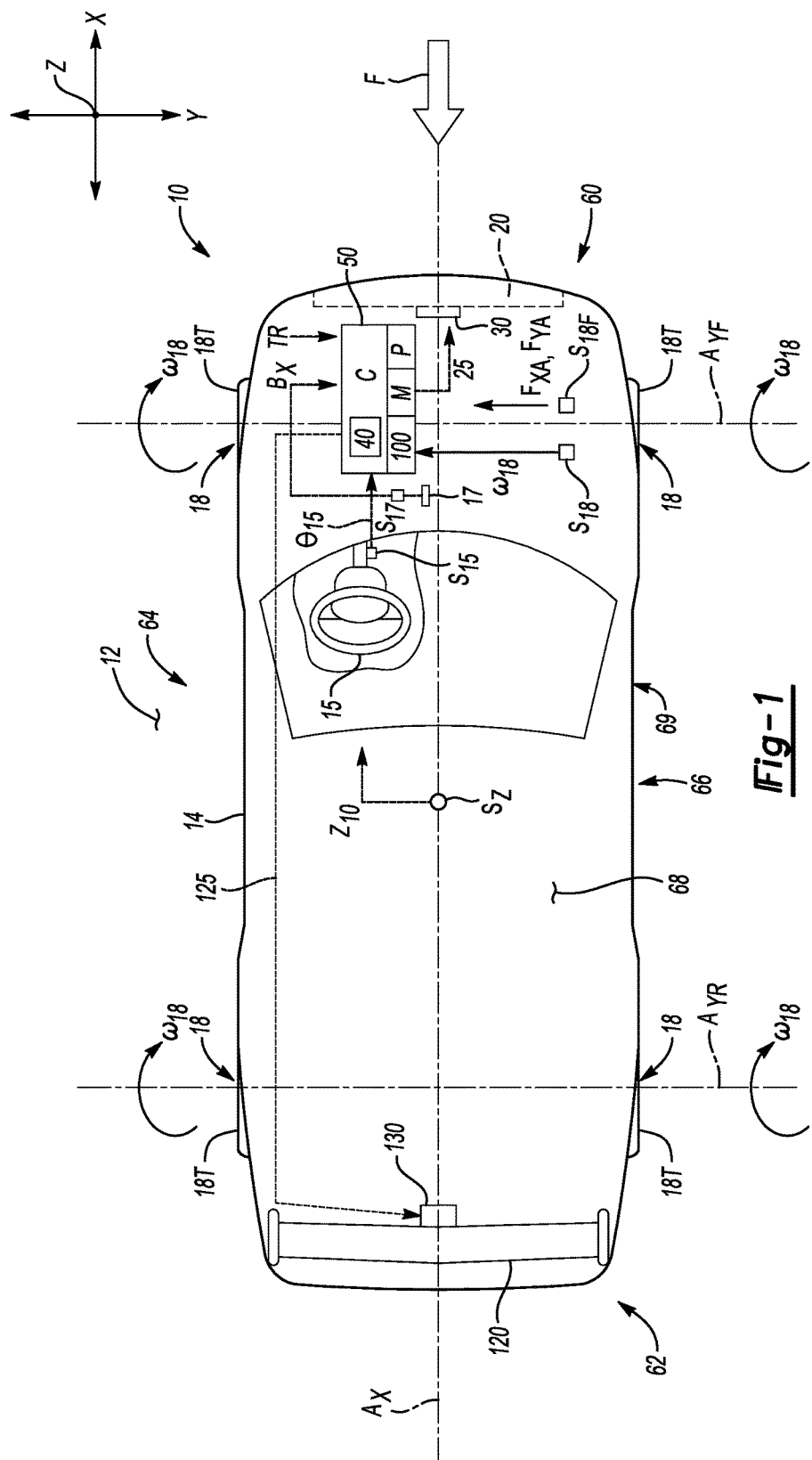
FIG. 1 is a schematic top view illustration of a vehicle having a controller configured to execute model-based aerodynamic control of one or more active aerodynamic elements as set forth herein.

Referring to the drawings, wherein like reference numbers refer to like components, a vehicle 10 having a body 14 and one or more active dynamic elements 20 and/or 120 is depicted schematically in FIG. 1 in the act of traveling with respect to a road surface 12. Although a passenger sedan is depicted in FIG. 1, the vehicle 10 may be embodied as any wheeled vehicle or mobile platform suitable for transporting passengers or cargo. As will be described below with particular reference to FIGS. 2 and 3, the vehicle 10 includes a controller (C) 50 that is configured to receive or otherwise determine dynamic inputs, whether driver-requested or autonomously-determined. The dynamic inputs may include, for instance, vehicle braking levels (arrow $B_x$), steering angle (arrow $\theta_{15}$), and torque request (arrow TR), possibly in conjunction with a suitable tire friction model 40 or other source of information regarding tire coefficients of friction as explained below. The controller 50 ultimately determines aerodynamic forces to command via one or more of the active aerodynamic elements 20 and/or 120.

As used herein, the term "active aerodynamic element" refers to any moveable or repositionable panel, surface, or other component of the vehicle 10 having a variable position that can be dynamically adjusted in response to control signals (arrows 25, 125) transmitted by the controller 50. Typically, control of the active aerodynamic element 20, 120 results in deployment of the active aerodynamic elements 20, 120 into the ambient airstream (arrow F), e.g., by extension away from the body 14 and into the ambient airstream (arrow F). Other embodiments may rotate the active aerodynamic elements 20, 120 with respect to the body 14 and into the oncoming airstream (arrow F).

With respect to a typical XYZ frame of reference as depicted in the upper right corner of FIG. 1, the X axis is considered herein to correspond to the longitudinal orientation and direction of travel of the vehicle 10, with the Y axis corresponding to the lateral direction, i.e., orthogonal to the longitudinal X direction. The Z axis corresponds to the vertical axis of the vehicle 10. Therefore, any aerodynamic downforce that is selectively applied by operation of the controller 50 and the present method 100 is applied in a direction toward the road surface 12 along the Z axis.

The vehicle 10 has a longitudinal axis $A_X$ arranged along a plane that is substantially parallel to the road surface 12. The vehicle 10 further includes a set of road wheels 18 each with a corresponding tire 18T in rolling frictional contact with the road surface 12. With respect to a driver of the vehicle 10 seated in a customary forward-facing driving position, the body 14 includes a front end 60, a rear end 62, a first lateral side 64, a second lateral side 66, a top side 68 that may include a vehicle roof, and an underbody side 69. The front end 60 is configured to face oncoming ambient airflow (arrow F) when the vehicle 10 is travelling with forward motion relative to the road surface 12. The lateral sides 64 and 66 are arranged generally parallel to each other and with respect to the longitudinal axis $A_X$ of the vehicle 10. The road wheels 18 are arranged along a respective front or a rear lateral axis $A_{YF}$ or $A_{YR}$ on a corresponding front or rear drive axle (not shown) arranged orthogonally with respect to the longitudinal axis $A_X$.

As the vehicle 10 moves relative to the road surface 12, the ambient airflow (arrow F) passes around and past the body 14 and eventually recombines in a wake area located immediately aft of the rear end 62, as is well known in the art. In order to optimize the aerodynamic performance of the vehicle 10 in the face of such an ambient airflow (arrow F), the body 14 may include one or more of the active aerodynamic elements 20 and/or 120, both of which are shown schematically in FIG. 1 as a non-limiting example splitter and/or air dam system and rear wing, respectively. In some embodiments, the active aerodynamic element 20 may be a first aerodynamic element positioned proximate the front end 60 and the active aerodynamic element 120 may be a second aerodynamic element positioned proximate the rear end 62, with the controller 50 independently controlling the active aerodynamic elements 20 and 120.

The active aerodynamic elements 20 and/or 120 may include other possible configurations, such as but not limited to louvers, flaps, diffusers located on the underbody side 69, wings or winglets extending from the sides 64 and 66, and/or other conventional active aerodynamic elements. The active aerodynamic element 20 and/or 120, regardless of configuration and placement with respect to the body 14, each has a corresponding variable position that can be selectively and automatically controlled via operation of an associated actuator, for instance the example actuators 30 and 130 depicted schematically in FIG. 1.

As explained below with particular reference to FIGS. 2 and 3, the actuators 30 and 130 are selectively controlled by the controller 50 via execution of a set of instructions embodying the method 100. Control according to the method 100 occurs in real-time response to changing vehicle dynamics and dynamic input signals. More specifically, the controller 50 uses calibrated information regarding tire coefficients of friction, e.g., from the tire friction model 40, particularly longitudinal and lateral tire coefficients of friction as explained below, in order to determine and allocate, in real-time, any aerodynamic forces from the available active aerodynamic elements aboard the vehicle 10, e.g., the active aerodynamic elements 20 and/or 120. The controller 50 thereafter commands the aerodynamic forces via control of the respective actuators 30 and/or 130.

The actuators 30, 130 shown in FIG. 1 may be embodied as any suitable linear or rotary actuator. Example actuators include solenoids, ball screw assemblies, and linear or rotary electric motors, and may be controlled via application of a calibrated voltage or electrical current, pneumatic or hydraulic power, or any other suitable control stimulus. The limits of the control range may be calibrated to correspond to a fully-deployed and a fully-stowed position of the respective active aerodynamic element 20 and 120, such that a fully-energized actuator 30 or 130 causes full deployment of the corresponding active aerodynamic elements 20 or 120, and vice versa for stowing of the active aerodynamic elements 20 or 120. The controller 50 also determines and applies modeled tire friction capability using the tire friction model 40 and driver inputs as detected aboard the vehicle 10 to determine appropriate aerodynamic force targets for the active aerodynamic elements 20 and/or 120. The controller 50 ultimately commands a corresponding position of the actuators 30, 130 within the corresponding stowed-deployed range of motion of the active aerodynamic elements 20 and/or 120 to achieve the calculated force targets.

The controller 50 shown schematically in FIG. 1 may be embodied as one or more digital computers having a processor (P) and tangible, non-transitory memory (M), e.g., optical, magnetic, flash, or other read only memory. The controller 50 may also include sufficient amounts of random access memory, electrically-erasable programmable read only memory, and the like, as well as a high-speed clock, analog-to-digital and digital-to-analog circuitry, and input/output circuitry and devices, as well as appropriate signal conditioning and buffer circuitry. The controller 50 may be embodied as a vehicle body control module or any other suitable computer control module configured to control the active aerodynamic elements 20 and/or 120 as set forth herein.

As is well understood in the art, the use of an aerodynamic element such as, for instance, the active aerodynamic element 20 shown at the front end 60 in FIG. 1, can create a pressure differential sufficient for providing an aerodynamic downforce on the vehicle 10. Similarly, the active aerodynamic element 120 located at the rear end 62 of the vehicle 10 can create a pressure differential and resultant aerodynamic downforce on the rear end 62. Other types of aerodynamic elements, whether passive/fixed or actively controlled, can be used on any of the aforementioned sides of the body 14 to provide aerodynamic downforces at any desired locations.

The actuators 30 or 130 can therefore be selectively controlled via transmission of suitable electronic control signals (arrows 25 and 125) from the controller 50. The receipt of electronic control signals (arrows 25 and 125) by the actuators 20 or 120 initiates an action of the actuators 20, 120 to change the relative position of the active aerodynamic elements 20 and/or 120 with respect to the body 14 and the ambient airflow (arrow F), unlike aerodynamic elements having a permanent fixed position with respect to the body 14.

The vehicle 10 of FIG. 1 may include various sensors that are collectively used to determine real-time driver inputs and vehicle dynamics. Such sensors may include a steering angle sensor $S_{15}$ positioned with respect to a steering column and operable to measure a steering angle imparted via a steering wheel 15, whether by a driver of the vehicle 10 or autonomously. The steering angle (arrow $\theta_{15}$), which may be directly measured as noted above or calculated, is transmitted by the steering angle sensor $S_{15}$ to the controller 50. Speed sensors $S_{18}$ maybe used to measure individual rotational speeds of the road wheels 18, or of a drive axle to which oppositely-positioned road wheels 18 are connected, and to transmit the measured speed (arrow $\omega_{18}$) to the controller 50. While a single speed sensor $S_{18}$ is depicted in FIG. 1 for illustrative simplicity, a plurality of speed sensors $S_{18}$ may be used, each proximate a respective one of the road wheels 18 on each of the lateral axes $A_{YR}$ and $A_{YF}$ of the respective rear and front drive axes (not shown), and/or on a transmission output member (not shown). Additional sensors may include a braking sensor $S_{17}$ operable for measuring a force applied to or an amount of travel of a brake pedal 17 and communicating a measured braking level (arrow $B_X$) to the controller 50, and an optional yaw rate sensor $S_Z$ outputting a yaw rate (arrow $Z_{10}$) as described below with reference to FIGS. 2 and 3.

As disclosed above, the controller 50 may be programmed with the tire friction model 40 and with any necessary calibrated values needed for executing the method 100. The present approach considers longitudinal and lateral tire coefficients of friction of the tires 18T, as well as calculated and/or measured longitudinal and lateral forces acting on the tires 18T. The control actions automatically commanded by the controller 50 in response to these modeled, calibrated, and/or measured values can be determined and applied per tire or per drive axle depending as appropriate for a given set of active aerodynamic elements.

The tire friction model 40 used by the controller 50 may provide the tire coefficients of friction using any suitable modeled, estimated, calibrated/pre-recorded, or calculated approach. For instance, standard anti-lock braking system speed sensors may be used to compute longitudinal tire slip, and the tire coefficients of friction may be estimated or modeled as linear or non-linear functions of normalized relative velocity between the road surface 12 and tires 18T, as is known in the art. Tire normal forces, i.e., the net force acting on each tire 18T in the vertical (Z) direction, also play a significant role in the dynamics of the vehicle 10, and can vary with tire pressure, temperature, tire load, and the tire/road coefficient of friction. Such normal forces may be considered as part of the modeling approach taken by the tire friction model 40. However, within the scope of the present disclosure the tire friction model 40 may use any conventional modeling or estimating process to determine the tire coefficients of friction in the longitudinal and lateral directions, i.e., $\mu_X$ and $\mu_Y$. For instance, a slope of a tire characteristic curve may be evaluated by the controller 50 for linearity, with estimation of the tire coefficient of friction estimated by correlating the slope of such a curve with the tire coefficients of friction.

A goal of the present method 100 is to determine appropriate aerodynamic force targets for any available active aerodynamic elements, e.g., the active aerodynamic elements 20 and/or 120 of FIG. 1. This may be accomplished in part by considering tire friction from the tire friction model 40 or other source as noted above, as well as processing other driver inputs such as the steering angle (arrow $\theta_{15}$), braking level (arrow $B_X$), wheel speeds (arrow $\omega_{18}$), and other possible values such as yaw rate. The total aerodynamic force, denoted $F_{ZAT}$ hereinbelow, may be determined as the sum of the base aerodynamic and inertial forces ($F_{ZB}$) provided by the vehicle 10 with the active aerodynamic elements 20, 120 in the stowed position and any contribution of the active aerodynamic elements 20, 120 in an at least partially-deployed state.

Figure 2:
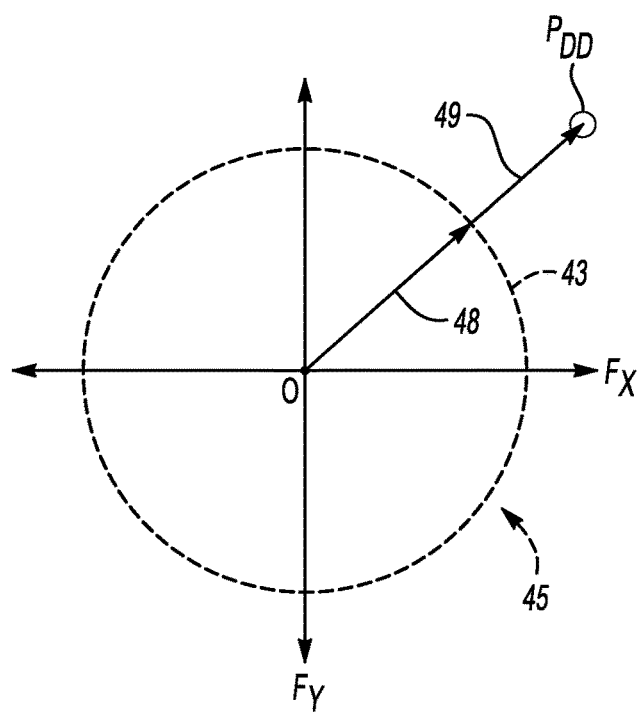
FIG. 2 is a schematic illustration of base aerodynamic capabilities in terms of longitudinal and lateral tire forces in relation to a requested aerodynamic performance operating point of the vehicle shown in FIG. 1.

The body 14 of the vehicle 10 provides a known "base" amount of aerodynamic down force, which is depicted graphically in FIG. 2 as a circular trace 45. The base level of aerodynamic downforce (arrow 48) for a given requested aerodynamic performance operating point $P_{DD}$ may not always be sufficient, for instance during certain high-speed maneuvers such as hard braking or while aggressively cornering. In those instances, a vector representing the aerodynamic downforce (arrow 48) that is drawn from the origin (O) of trace 45 toward the requested aerodynamic performance operating point $P_{DD}$ will terminate at the boundary 43 of the circular trace 45, with the boundary 43 representing the aerodynamic performance limits of the body 14 absent deployment of the active aerodynamic elements 20 and/or 120. The controller 50 thus automatically determines the magnitude of any additional aerodynamic downforce needed from deployment of the active aerodynamic elements 20 and/or 120 to satisfy the driver-requested performance of point $P_{DD}$. The additional aerodynamic downforce is represented by arrow 49 in FIG. 2.

As part of the method 100, the controller 50 of FIG. 1 considers tire forces and tire coefficients of friction in both the longitudinal (X) and lateral (Y) directions with respect to a direction of motion of the vehicle 10, or more precisely, of the road wheels 18. The controller 50 may determine the aerodynamic forces for the controller 50 to apply ($F_{ZAT}$) by solving the following equation:

$$F_{ZAT} = \sum_{L,R} \sqrt{\left(\left(\frac{F_X}{\mu_X}\right)^2 + \left(\frac{F_Y}{\mu_Y}\right)^2\right)} - F_{ZB}$$

where $F_X$ is the computed tire force acting in the longitudinal direction, $F_Y$ is the computed tire force acting in the lateral direction, $\mu_X$ is the tire coefficient of friction in the longitudinal direction, and $\mu_Y$ is the tire coefficient of friction in the lateral direction. With respect to the computed tire forces $F_X$ and $F_Y$, these values may be determined as the maximum of a calculated requested tire force, e.g., determined via the dynamic input signals and kinematics data, and an actual or measured tire force for the respective longitudinal and lateral directions.

The calculated requested tire force in the longitudinal direction may be determined, as is known in the art, using a calibrated mapping of dynamic input signals corresponding to brake pedal position and vehicle speed, the latter of which may be determined via the sensors $S_{17}$ and $S_{18}$. Torque request (TR) may be determined via a similar pedal sensor, such as one connected to or in communication with an accelerator pedal. Thus, requested tire force in the longitudinal direction is information that is readily available to the controller 50. Requested tire force in the lateral (Y) direction may be determined as a function of the yaw rate of the vehicle 10. The yaw rate, in turn, is conventionally used in stability control systems, and can be readily estimated as a function of kinematics of the vehicle 10, for instance using such values as steering angle from sensor $S_{15}$, or vehicle speed from the sensors $S_{18}$, tire radius. In other embodiments the optional yaw sensor $S_Z$ of FIG. 1 may be used to directly measure or determine the yaw rate and transmit the measured yaw rate as a yaw rate signal (arrow $Z_{10}$) to the controller 50.

Actual tire forces $F_{X4}$ and $F_{Y4}$ may be determined using any suitable methodology, such as by using tire force sensors $S_{18F}$ of one of the types known in the art. For instance, load sensors may be positioned at different locations of the road wheels 18 and configured to measure values corresponding to compression and extension forces. Examples tire force sensors include insulated ceramic or other types of force sensors, which output a variable resistance in response to an applied load along a given axis. The actual tire force ($F_{X4}$, $F_{Y4}$) or corresponding resistance values may be transmitted to the controller 50, which in turn stores the measured values in memory M and/or calculates the actual tire force ($F_{X4}$, $F_{Y4}$) from the resistance or other measured values depending on the embodiment.

The base aerodynamic and inertial forces, i.e., $F_{ZB}$, may be determined as a function of known vehicle mass, inertial effects, and base aerodynamic effects for the vehicle 10, as is known in the art. For instance, the vertical forces due to mass and acceleration of the vehicle 10 may be determined offline and recorded in memory M of the controller 50 or calculated online using a vehicle dynamics model. The vehicle 10 may be subjected to steady-state wind tunnel testing in order to determine the base aerodynamic forces acting in the vertical direction, and likewise stored in a memory M of controller 50, e.g., in a series of lookup tables indexed by different vehicle speeds. Since inertial effects on vertical forces are dynamic, the resultant duty cycle of the actuators 30, 130 will be relatively high.

Once the values for the tire forces $F_X$, $F_Y$ and tire coefficients of friction $\mu_X$, $\mu_Y$ are determined, the controller 50 of FIG. 1 can solve the above equation, per axle if desired or per road wheel 18, to thereby determine the total aerodynamic forces ($F_{ZAT}$) to meet the present driver demand. This value corresponds to arrow 49 of FIG. 2.

Figure 3:
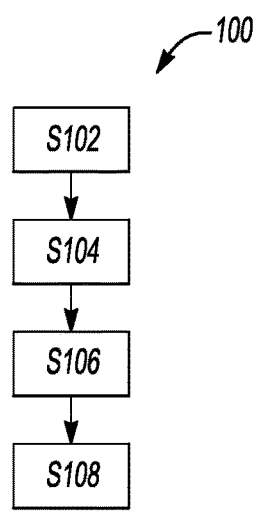
FIG. 3 is a flow chart describing an example method for controlling active aerodynamic elements aboard the vehicle of FIG. 1 in response to driver inputs.

FIG. 3 depicts a simplified example embodiment of the method 100. In step S102, the controller 50 of FIG. 1 first determines a set of driver inputs and vehicle dynamic or kinematics data. For example, step S102 may include receiving dynamic input signals from the various sensors aboard the vehicle 10, such as the steering angle (arrow $\theta_{15}$) from the steering angle sensor $S_{15}$, braking levels (arrow $B_X$) from the braking sensor ($S_{17}$), wheel speeds (arrow $\omega_{18}$) from speed sensors $S_{18}$, yaw rate from the optional yaw rate sensor $S_Z$, etc. Dynamic data may be measured or calculated, such as yaw rate of the vehicle 10 with respect to a yaw axis, i.e., the z-axis in the XYZ frame of reference shown in FIG. 1. The method 100 proceeds to step S104 when all of the above-noted signals are received or values are otherwise determined.

At step S104, the controller 50 next determines the tire coefficients of friction in the longitudinal and lateral directions, $\mu_X$ and $\mu_Y$, from the tire friction model 40. For instance, the tire coefficients of friction may be determined via accessing a series of lookup tables and/or otherwise calculated or estimated using the tire friction model 40 or other source. Step S104 also includes measuring or otherwise determining the tire forces $F_X$ and $F_Y$, in the respective longitudinal and lateral directions in the manner noted above.

Step S106 includes calculating the total aerodynamic forces, $F_{ZAT}$, using the formula set forth above. Step S106 may be applied per road wheel 18 or per drive axle. The method 100 then proceeds to step S108.

At step S108, the controller 50 applies the calculated total aerodynamic forces, $F_{ZAT}$, from step S106. To do this, the controller 50 may transmit control signals (arrows 25, 125) to one or both of the actuators 30 and/or 130 as needed. When multiple aerodynamic elements are included in the vehicle 10, step S108 may include dynamically allocating the aerodynamic downforce contributions of each active aerodynamic element 20, 120. In a design having a single aerodynamic element, step S108 includes using the controller 50 to control the single aerodynamic element in use. Thus, by using the method 100 described above, dynamic vehicle inputs are considered in real-time to determine the total aerodynamic force contributions from one or more active aerodynamic elements aboard a vehicle such as is shown in FIG. 1, and to ensure that such contributions are commanded as accurate force targets during operation of the vehicle 10.

While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method for controlling an active aerodynamic element in a vehicle having a body and a plurality of road wheels with tires in contact with a road surface, the method comprising:
   receiving a set of input signals and vehicle kinematics data, wherein the input signals correspond to a requested aerodynamic performance operating point of the vehicle;
   measuring a set of actual tire forces;
   determining coefficients of friction of the tires in a longitudinal and lateral direction with respect to the vehicle;
   computing longitudinal and lateral forces acting on the tires, via a controller, using the measured actual tire forces, the set of input signals, and the kinematics data;
   calculating, via the controller, a total aerodynamic downforce needed to achieve the requested aerodynamic performance operating point as a function of the longitudinal and lateral forces acting on the tires and the coefficients of friction of the tires; and
   controlling a position of the active aerodynamic element with respect to the body, via the controller, to provide the calculated total aerodynamic downforce.

2. The method of claim 1, wherein the vehicle includes an actuator connected to the active aerodynamic element, and wherein controlling a position of the aerodynamic element includes transmitting control signals from the controller to the actuator.

3. The method of claim 1, wherein computing the longitudinal and lateral forces acting on the tires includes determining a maximum of a calculated requested tire force and the actual tire forces for the respective longitudinal and lateral directions.

4. The method of claim 1, wherein measuring the set of actual tire forces includes using corresponding force sensors.

5. The method of claim 1, wherein the set of input signals includes a steering angle, a braking level, and a speed of the vehicle, the method further comprising: measuring each of the steering angle, the braking level, and the speed of the vehicle via a corresponding sensor.

6. The method of claim 1, wherein the vehicle includes a front end and a rear end, the active aerodynamic element includes a first aerodynamic element positioned proximate the first end and a second aerodynamic element positioned proximate the rear end, and controlling a position of the active aerodynamic element includes independently controlling the first and second aerodynamic elements.

7. A system for use in a vehicle having a body and a plurality of road wheels with tires in contact with a road surface, the system comprising:
an active aerodynamic element;
an actuator connected to the active aerodynamic element and operable for adjusting a position of the active aerodynamic element with respect to the body in response to control signals; and
a controller configured to:
receive a set of input signals and vehicle kinematics data, wherein the input signals correspond to a requested aerodynamic performance operating point of the vehicle;
determine coefficients of friction of the tires in a longitudinal and a lateral direction with respect to the vehicle;
compute longitudinal and lateral forces acting on the tires using the actual tire forces, the input signals, and the kinematics data;
determine a set of actual tire forces of the tires;
calculate a total aerodynamic downforce to achieve the requested aerodynamic performance operating point as a function of the longitudinal and lateral forces acting on the tires and the coefficients of friction of the tires; and
control the position of the active aerodynamic element via transmission of the control signals to the actuator to thereby provide the calculated total aerodynamic downforce.

8. The system of claim 7, wherein the vehicle includes a front end and a rear end, the active aerodynamic element includes a first aerodynamic element positioned proximate the first end and a second aerodynamic element positioned proximate the rear end, and the controller is configured to control the position of the active aerodynamic element by independently controlling the first and second aerodynamic elements.

9. The system of claim 7, wherein the controller is configured to control the position of the active aerodynamic element by initiating a deployment of the active aerodynamic element into the oncoming ambient airstream.

10. The system of claim 7, wherein the controller is configured to compute the longitudinal and lateral forces acting on the tires by determining a maximum of a calculated requested tire force and the actual tire forces for the respective longitudinal and lateral directions.

11. The system of claim 7, further comprising a plurality of force sensors, wherein the controller is configured to measure the actual tire forces using corresponding force sensors of the plurality of force sensors.

12. The system of claim 7, further comprising a steering angle sensor, a braking level sensor, and a speed sensor, wherein the controller is configured to receive a steering angle, a braking level, and a speed of the vehicle as the input signals via a corresponding one of the steering angle sensor, braking level sensor, and speed sensor.

13. A vehicle comprising:
a body;
a plurality of road wheels each including a tire in rolling contact with a road surface;
an active aerodynamic element connected to the body, and configured to selectively deploy from the body into an oncoming ambient airstream when the vehicle is in motion;
an actuator connected to the active aerodynamic element and operable for adjusting a position of the active aerodynamic element in response to control signals; and
a controller configured to:
receive a set of input signals and vehicle kinematics data, wherein the input signals correspond to a requested aerodynamic performance operating point of the vehicle;
determine a set of coefficients of friction of the tires in a longitudinal and a lateral direction with respect to the vehicle;
determine actual tire forces of the tires;
compute a set of longitudinal and lateral forces acting on the tires using actual tire forces, the input signals, and the kinematics data;
calculate a total aerodynamic downforce to achieve the requested aerodynamic performance operating point as a function of the coefficients of friction of the tires and the longitudinal and lateral forces acting on the tires; and
control a position of the active aerodynamic element via transmission of the control signals to the actuator to thereby provide the calculated total aerodynamic downforce.

14. The vehicle of claim 13, wherein the controller is configured to compute the set of longitudinal and lateral forces acting on the tires by determining a maximum of a calculated requested tire force and the actual tire forces for the respective longitudinal and lateral directions.

15. The vehicle of claim 13, further comprising a plurality of force sensors, wherein the controller is configured to determine the actual tire forces by measuring the actual tire forces using corresponding force sensors of the plurality of force sensors.

16. The vehicle of claim 13, further comprising a steering angle sensor, a braking level sensor, and a speed sensor, wherein the controller is configured to receive a steering angle, a braking level, and a speed of the vehicle as the input signals via a corresponding one of the steering angle sensor, the braking level sensor, and the speed sensor.

17. The vehicle of claim 13, wherein the body includes a front end and a rear end, the active aerodynamic element includes a first aerodynamic element positioned proximate the first end and a second aerodynamic element positioned proximate the rear end, and the controller is configured to control the position of the active aerodynamic element by independently controlling the first and second aerodynamic elements.

* * * * *